INTERFERENCE SUPPRESSION IN RADIO SIGNALING SYSTEMS
Filed June 5, 1947 2 SHEETS—SHEET 1
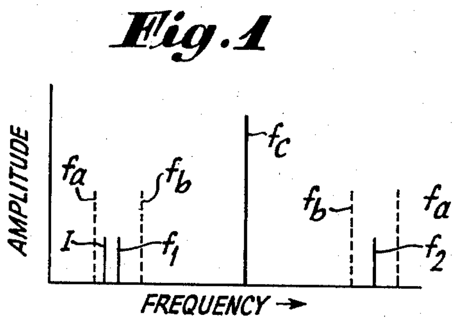
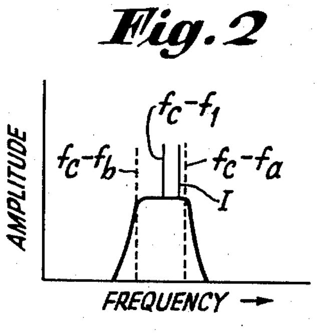
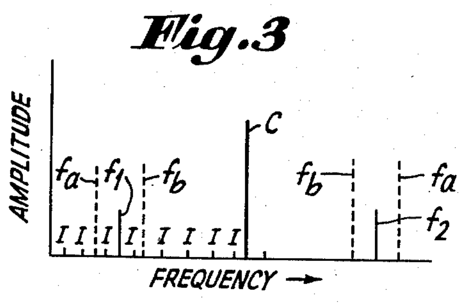
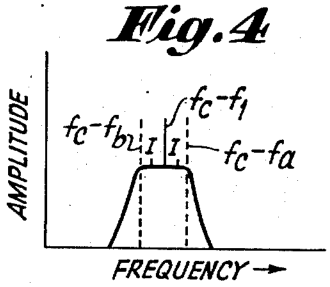
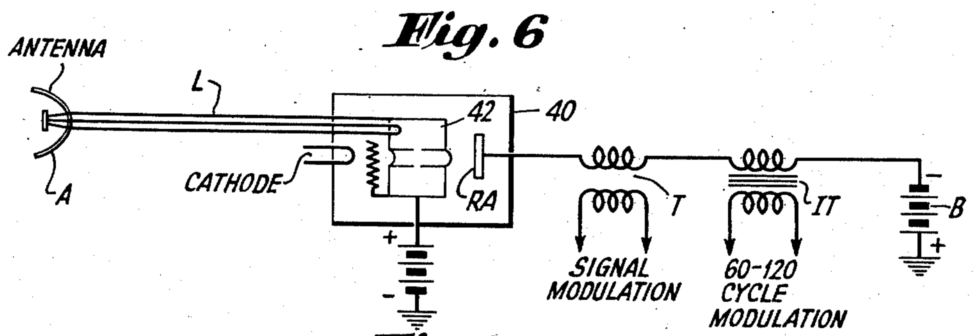
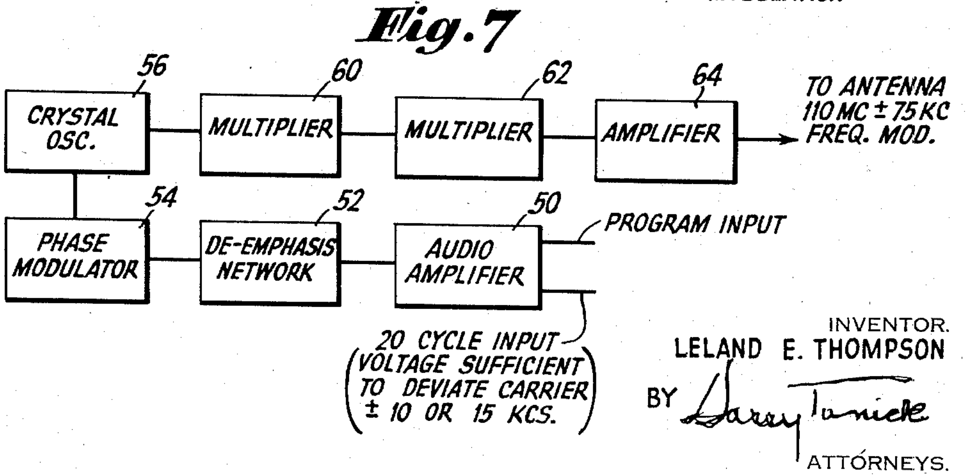
INVENTOR.
LELAND E. THOMPSON
BY Darry Tonicke
ATTORNEYS.

Dec. 25, 1951 — L. E. THOMPSON — 2,579,882

INTERFERENCE SUPPRESSION IN RADIO SIGNALING SYSTEMS

Filed June 5, 1947 — 2 SHEETS—SHEET 2

INVENTOR.
LELAND E. THOMPSON

BY [signature]

ATTORNEYS.

Patented Dec. 25, 1951

2,579,882

UNITED STATES PATENT OFFICE 2,579,882

INTERFERENCE SUPPRESSION IN RADIO SIGNALING SYSTEMS

Leland E. Thompson, Merchantville, N. J., assignor to Radio Corporation of America, a corporation of Delaware Application June 5, 1947, Serial No. 752,652

2 Claims. (Cl. 250—6)

In microwave relay systems, it is desirable to use the same radio frequency channel over and over as much as possible to conserve frequency spectrum. This may be accomplished by geographical separation of the systems or by using highly directive antennas in the systems. Even where the receivers of the system are separated or where directivity is used, some interference will take place because the most directive receivers and transmitters known are not completely free of interference. Moreover, even when the systems are separated, interference may result under conditions of unusual propagation. Then the interfering wave in the receiver will produce a heterodyned beat note of fixed frequency in the audible range thereby creating intolerable interference.

The present invention provides a method and means whereby interference on the same radio frequency channel can be reduced and with the additional benefit of directive antennas in the system many different transmissions from different directions may be received at a central point in a metropolitan area without interference when all of them are on the same radio frequency channel.

The present invention also allows a transmitter and a receiver to operate at one location on closely adjacent frequencies without interference. This is accomplished by reducing the effectiveness of transmitter signals picked up by the receiver to create interference in the receiver output.

This interference reduction is accomplished as follows:

The interfering transmitter is frequency modulated by low frequency oscillations of the order of 60 cycles per second. This modulation is in addition to and distinct from the signal modulation used in the transmitter causing the interference. This low frequency modulation is filtered out at the receiver so that the intelligence modulation band is not affected. The interfering station is then received with much less interference because the total power of the interfering wave is spread out by the low frequency modulation and each component of the interfering wave is greatly reduced in amplitude although more components are added. Moreover, the beat note mentioned above, if any, will be of varying frequency and will swing up and down the scale to cause minimum interference in the system.

The desired signal may also be frequency modulated with the same or different low frequency thereby increasing the interference reduction because this further disperses the beat notes and further reduces the discernible interference. The effects tend to add up so that some benefit will be obtained by swinging the interfering carrier at the low frequency rate and more benefit will be obtained when the interfering carrier and the carrier it is desired to receive are both frequency modulated by the low frequency alternating current.

My invention also reduces interference in FM broadcast systems. For example, where a crystal controlled or otherwise stabilized FM transmitter is used such as in FM broadcasting it will be advantageous to apply a suitable low frequency modulating voltage to the modulator tube.

In the case of FM broadcasting, two stations on the same frequency channel will produce a heterodyne beat note interference during moments when modulation is low on both the desired and the undesired signal. Interference may not be apparent when one or both stations are being modulated. This invention may be applied to broadcast FM transmitters and also to multi-channel communication FM systems. The explanation of the action is the same as described above.

When my invention is applied to FM broadcasting a very low frequency modulation is to be used so that it does not produce a signal in the audio range. For example, a 20 cycle per second sine wave A. C. voltage may be used to deviate the transmitter frequency plus and minus 10 kilocycles.

In describing my invention in detail, reference will be made to the attached drawings where:

Figs. 1 to 4 inclusive are wave spectrum graphs and circuit characteristics used to explain the manner in which my invention is carried out and the manner in which the effectiveness of the interference in various signal systems is reduced in accordance with my invention.

Fig. 6 illustrates a high frequency modulator with means for modulating the carrier by signals and by low frequency voltages for interference reduction, and Fig. 7 illustrates a frequency modulation system such as might be used for broadcast purposes arranged in accordance with my invention.

Figure 5:
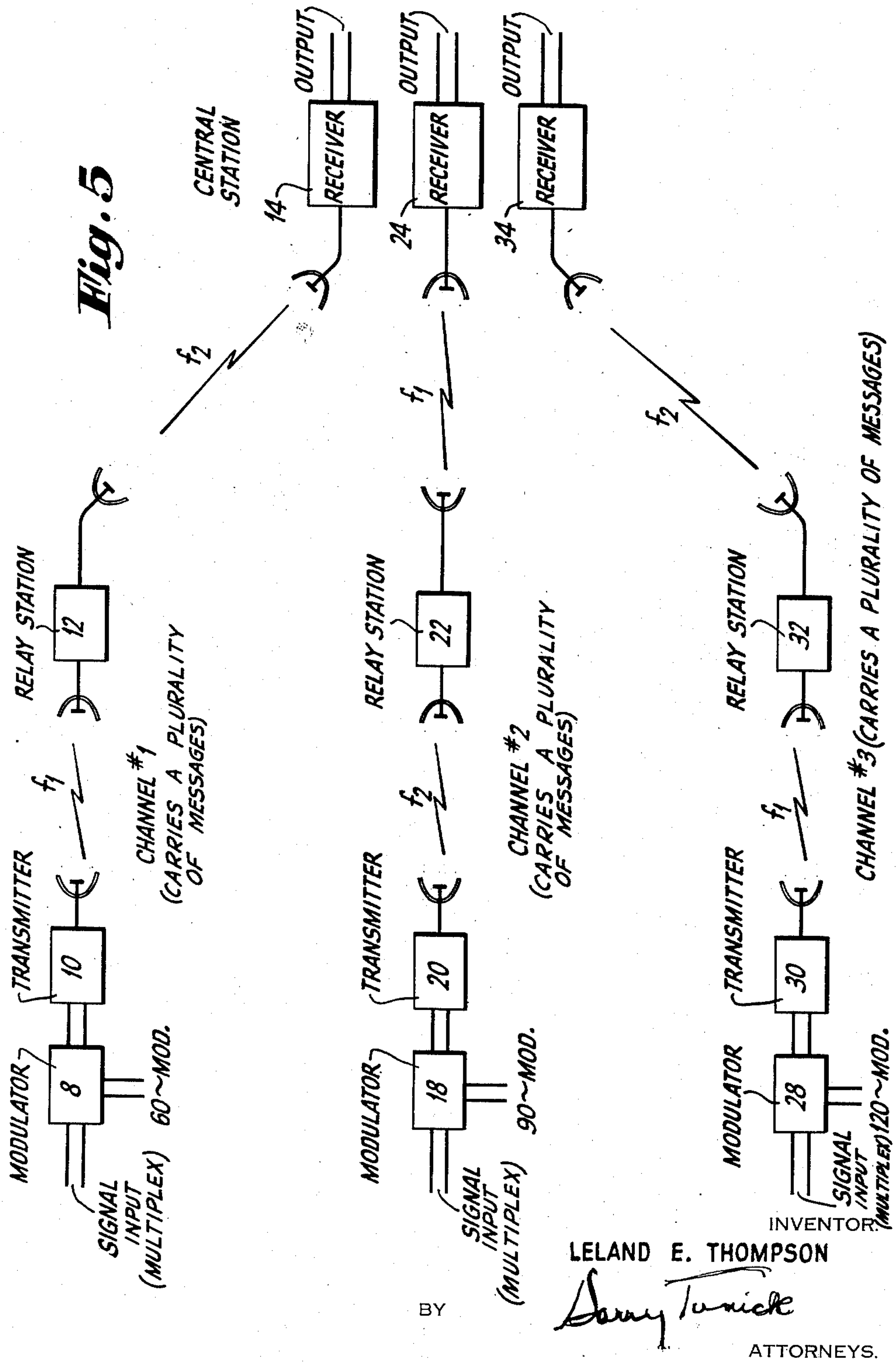
Fig. 5 illustrates an ultra high frequency relaying system arranged in accordance with my invention.

An ultra high frequency relay system as referred to above is shown in Fig. 5. Such a system might comprise radio frequency channels 1, 2, 3 and so forth operated each to carry a plurality (say 10) of messages with different messages or modulations on each of the radio frequency channels. The final radio relays of certain of the systems may operate on the same frequency. This is the case of channels 1 and 3. Then interference of the type described above will occur in receivers 14 and 34. It may also occur in receivers 24 and 14 or 34 if $f_1$ is close to $f_2$. If, however, in accordance with my invention, the carriers in one or more of the radio frequency channels are modulated by low frequency voltages in addition to the signal modulations, as will be shown in a simple manner hereafter, the effects of the interfering signals will be greatly reduced. Such low frequency modulation might be carried out by applying alternating current of 60 cycles per second to modulator 8, 90 cycles per second to modulator 18 and 120 cycles per second to modulator 28. Assume, for example, that only the interfering signal is frequency modulated with the low frequency. Although the method works with any type of signal modulation, it will also be assumed that phase modulation is used. In Fig. 1, $f_c$ represents the desired carrier received at the receiver, say 34 of Fig. 5, $f_1$ and $f_2$ are two phase modulation side bands produced by modulating the carrier with a single signal tone, for example, 1,000 cycles. Assume that this 1,000 cycle signal tone is keyed to produce a telegraph signal channel.

At this point, to clearly show the method by which the interference is reduced, the action of the detector in the radio receiver will be described, although it is well known in the art. The radio or intermediate frequency band width of the receiver may be very much greater than that necessary to pass all the frequencies shown in Fig. 1. In fact, the single telegraph signal modulation side bands shown as $f_1$ and $f_2$ may be one of a hundred or more telegraph signals modulating the carrier $f_c$. The intermediate frequency band width must be large enough to accept all of these modulation side bands and in practice is made larger to accommodate unwanted frequency shift in the transmitter and receiver oscillators. After the detector, however, each telegraph modulation tone is obtained which is exactly the same frequency as the tone which modulated the transmitter carrier ($f_c$) and is not affected by any other modulations on the carrier, including unwanted frequency shifts in the transmitter and receiver oscillators.

After the detector, therefore, narrow filters may be used to separate the various signals modulating the carrier $f_c$. The characteristic of one of these filters is shown in Fig. 2. All frequencies between $f_a$ and $f_b$ on one side of the carrier $f_c$ before detection as shown in Fig. 1 are accepted by the filter shown in Fig. 2. All other signal modulations or interfering signals are removed by the filter. If, however, an interfering signal is present as shown at I in Fig. 1, it wlil be present as interference in the pass band of the filter after detection as shown in Fig. 2.

The desired telegraph signal after detection is represented by $f_c—f_1$ in Fig. 2. The interference is represented by I. This interference is understood to be the carrier or a modulation side band of an interfering station. According to the present invention, this interfering signal carrier is frequency modulated by a low frequency modulating current, for example 60 cycles per second, and with a frequency swing of several thousand cycles or more. All modulation side bands of the interfering station are consequently frequency modulated at this low frequency. The single component of interference I in Fig. 1 and Fig. 2 is then changed to a large number of smaller components which are shown in Fig. 3. In other words, the interfering signal I is caused to swing in frequency through the pass band of the filter which follows the detector so that part of the time or most of the time the interference is not present in the output of this filter. The actual amount of energy that is present is represented by I in Fig. 4 and it is observed that there are two components of the interfering wave present in this example which have an amplitude very much less than the single component of interference shown in Fig. 2.

The same interference reducing action may be obtained by frequency modulating the desired signal $f_c$ by the low frequency modulating voltage. In this case, the relation between $f_c$, $f_1$, and $f_2$ in Fig. 1 is not changed as all these frequencies are together modulated by the low frequency. Thus, the telegraph signal after detection shown as $f_c—f_1$ in Fig. 2 is not changed by the low frequency modulating voltage, but the interference shown as I in Fig. 2 is now in the pass band of the filter only part of the time instead of all of the time and the effects of this interference are greatly reduced.

It will be apparent that the low frequency modulation placed on the desired signal carrier must not swing the frequency of this signal carrier so far that it passes outside the band width of the receiver. The radio frequency band width of the receiver is usually determined by the band width of the intermediate frequency amplifier stages and this band width must be distinguished from the band width of any one of the signal modulation channels, one of which is shown in Fig. 2 which passes frequencies only between $f_c—f_a$ and $f_c—f_b$. Thus, according to the invention, the low frequency modulation placed on either the interfering carrier or on the desired carrier must not swing the frequency of the carrier outside the radio frequency band width of the receiver used to receive the signals or the desired modulating signals will be distorted. This low frequency swing may, however, be substantially greater than the band width of the filter used to separate each channel after detection. In the case of telephone signal modulation where the filters after detection are greater in band width than those used for telegraph signals, it has been found that some interference reduction is apparent even though the low frequency modulation applied to the desired signal carrier or to the interfering signal carrier does not swing the interfering signal outside of the pass band of the filter. It is believed that this result may be due to the fact that when the interference is distributed over a band of frequencies it is less objectionable than when the interference energy is concentrated in a single tone.

Usually in microwave relay service, both the interfering station and the desired station will be under the control of the same owner or operator and thus such a system as that proposed for interference reduction may be effectively utilized. However, in some cases the interfering station is not under the control of the operator of the desired station, so that in such cases it is impossible as a practical matter to modulate the interfering signal carrier in the manner disclosed hereinabove; however, the interference-suppression results of this invention are equally obtainable when only the desired station transmitter is frequency-modulated, provided, of course, that the amplitude of the desired carrier $f_c$ is greater than that of the interfering carrier I, as shown in Fig. 1.

It is preferable that the low frequency voltage used to modulate the carrier be of a sine wave form. At the receiver detector output it may then be easily filtered from the signal frequencies.

The low frequency modulating voltage should preferably be at a frequency between 20 and 150 cycles per second. If the desired and undesired carriers are both modulated with this interference reducing voltage, either the phase should be opposite on the two carriers, or the modulating frequency should be different.

It is observed that the interference may be spread into other signal channels by this process of frequency modulating the carriers by a low frequency voltage whereas it existed in only one channel in Fig. 1. However, the interference may be so small in all the signal channels that it will not be apparent while if my invention is not used, it may be so serious as to make unusable the signal channel as shown by Fig. 1.

The transmitters 8, 10; 18, 20; 28 and 30 of the system of Fig. 5 may be as disclosed in my U. S. application Serial #576,453 filed February 6, 1945. Said application ripened on July 11, 1950 into Patent #2,514,425. A simplified showing of a satisfactory modulator for use here appears in Fig. 6 of the drawings. This modulator is to be used in units 8 and 10 of the channel #1. A klystron generator tube 40 of the reflex type is used. The antenna A is coupled by a line L to a loop in the single resonator cavity 42. The signal modulation is applied to transformer T in the negative supply lead for the reflector anode RA. This modulation may represent the signal per se in which case it is in the audible range or it may be a carrier modulated by the signal in which case it may be of higher frequency. The interference reducing modulation in the low frequency range is fed to the same electrode by low frequency transformer IT. The modulating potentials are superposed on the negative potential applied to the reflector anode RA from source B. The source B is shown as a battery but in practice is a rectifier and alternating current supply therefor. In ultra high frequency systems as used here, the rectifier filter may be imperfect in which case if the alternating current supply for the rectifier is of low frequency, the ripple at the fundamental frequency or its second harmonic appearing at the filter output and applied to the reflector anode constitutes the interference reducing modulation and the transformer IT and its alternating current excitation source may be omitted. In that case, means is supplied to adjust or regulate the filtering action as desired to thereby set the modulation magnitude and the extent to which it swings the carrier.

If interference modulation is used in the transmitter sending out the desired signal, in the example given above, channel 3, then the interfering modulations are to be out of phase or of different frequencies. When of the same frequency and from the same source, they may be made of opposite phase by proper arrangement of the transformer windings.

This method of interference reduction is more easily obtained at microwave frequencies when oscillators are used which are not controlled by a quartz crystal. In this case, frequency modulation at 60 and 120 cycles is readily obtained by the ripple voltage of the power supply. In addition, such oscillators have a random change in frequency produced by vibration or temperature changes, which aids in the reduction of interference. If the transmitter is controlled by a quartz crystal, then the low frequency modulation may be obtained by applying a suitable voltage to the transmitter modulating circuit.

When my invention is applied to frequency modulation systems, an arrangement as illustrated in Fig. 7 may be used. This FM transmitter is of the corrected phase modulation type. The audio amplifier 50 feeds the program to deemphasis network 52 and operates through a phase modulator 54 to modulate the phase of oscillatory energy held at substantially fixed frequency by a crystal in the oscillator 56. Multipliers 60 and 62 and amplifiers in 64 increase the frequency, the swing and the amplification as desired to supply output to an antenna or further frequency multipliers and amplifiers. If the system shown is for broadcasting sound programs, the output may be at 110 megacycles with a total swing of 150 kilocycles. The modulation to prevent interference may be fed to the amplifier 50 and may be of 20 cycles alternating current. Then, with the proper multiplication in the stages 60, 62, the carrier would be deviated plus and minus 10 or 15 kilocycles. Other types of frequency modulation systems may be used, for example, frequency modulators as shown by Crosby in the U. S. Patent 2,279,659 dated April 14, 1942 may be used. Then the interference modulation may be applied to the reactance tube modulator along with the signal. The interference reduction results for reasons described above as illustrated in Figs. 1 to 4. More interference reduction is obtained if the desired signal as well as the interfering signal is modulated by the low frequency voltages of sine wave form.

What is claimed is:

1. In a signalling system, in combination, a first transmitter sending a modulated carrier to a receiver, a second transmitter operating in the same frequency range and sending an undesired carrier to said receiver, and means for reducing the effects of interference between said modulated carrier and said undesired carrier in said receiver comprising means in said first transmitter for modulating the frequency of the said modulated carrier at a low audio rate and separate means in said second transmitter for modulating the frequency of the said undesired carrier at a low audio rate which is different from said first-mentioned audio rate.

2. In signalling apparatus, a plurality of carrier transmitters including at least one having means for modulating the transmitted carrier by a plurality of signals, a receiver for said one carrier including a detector and filters for separating said signals each from the others, and means for reducing the effects of interference in said receiver caused by reception of another of said carriers including means, in addition to said means for modulating, in the transmitter sending out said one carrier for sweeping the frequency of such carrier at a low audio frequency rate through a range greater than the band passed by one of said filters and no greater than the acceptance band of said receiver, and separate means in the transmitter sending out said other carrier for sweeping the frequency of such carrier at a different low audio frequency rate through a range greater than the band passed by one of said filters and no greater than the acceptance band of said receiver.

LELAND E. THOMPSON.

REFERENCES CITED

The following references are of record in the file of this patent:

UNITED STATES PATENTS

| Number | Name | Date |
|---|---|---|
| 1,877,858 | Hahnemann | Sept. 20, 1932 |
| 2,107,155 | Kleinhaur et al. | Feb. 1, 1938 |
| 2,118,610 | Koch | May 24, 1938 |
| 2,175,367 | Toulon | Oct. 10, 1939 |
| 2,283,575 | Roberts | May 19, 1942 |
| 2,298,409 | Peterson | Oct. 13, 1942 |
| 2,390,641 | Chatterjea et al. | Dec. 11, 1945 |
| 2,416,336 | Marchand | Feb. 25, 1947 |
| 2,429,504 | Ziegler | Oct. 21, 1947 |
| 2,448,055 | Silver et al. | Aug. 31, 1948 |
| 2,481,516 | Jacobsen | Sept. 13, 1949 |